United States Patent [19]

Lach

[11] Patent Number: 5,270,804
[45] Date of Patent: Dec. 14, 1993

[54] COLOR DISPLAY SYSTEM UTILIZING OPTICAL VALVES

[75] Inventor: Patrick Lach, Bordeaux, France

[73] Assignee: Sextant Avionique, Meudon la Foret, France

[21] Appl. No.: 796,249

[22] Filed: Nov. 21, 1991

[30] Foreign Application Priority Data

Nov. 21, 1990 [FR] France ............................... 90 14533

[51] Int. Cl.$^5$ ............................................. H04N 9/31
[52] U.S. Cl. ....................................... 358/62; 358/60; 353/33; 359/833; 359/850; 359/640
[58] Field of Search ............... 358/60, 61, 62; 353/30, 353/31, 33; 359/639, 640, 833, 850

[56] References Cited

U.S. PATENT DOCUMENTS

| 4,425,028 | 1/1984 | Gagnon et al. | 358/61 |
| 4,850,685 | 7/1989 | Kamakura et al. | 358/61 |
| 4,864,390 | 9/1989 | McKechnie et al. | 358/60 |
| 5,028,121 | 7/1991 | Baur et al. | 359/40 |
| 5,073,013 | 12/1991 | Sonehara et al. | 358/61 |
| 5,098,183 | 3/1992 | Sonehara | 353/33 |
| 5,130,826 | 7/1992 | Takanashi et al. | 358/61 |

FOREIGN PATENT DOCUMENTS

| 258927 | 3/1988 | European Pat. Off. . |
| 361559 | 4/1990 | European Pat. Off. . |
| 0362776 | 4/1990 | European Pat. Off. . |
| 376395 | 7/1990 | European Pat. Off. . |
| 0125791 | 6/1987 | Japan . |
| 768727 | 2/1957 | United Kingdom . |

OTHER PUBLICATIONS

WO-A-8 810 545 (Fraunhofer) Abstract, Dec. 1988.

Primary Examiner—Victor R. Kostak
Assistant Examiner—Jeffrey S. Murrell
Attorney, Agent, or Firm—Cushman, Darby & Cushman

[57] ABSTRACT

The disclosed device is aimed at improving the light output of this type of device without impairing its homogeneity in colour and luminance while, at the same time, limiting the amount of space occupied. In such a device, three optical valves are placed before three faces of a recombiner cube. The means used to separate a beam of white light into three beams of coloured light consist of a divider cube. The intersections of the treated surfaces of the, two cubes are aligned, and these treated surfaces are in sets of two in one and the same plane. Furthermore, outside the cubes, the optical paths of the three beams are identical, so that the optical distances between the source of white light and the valves are themselves identical.

10 Claims, 5 Drawing Sheets

(PRIOR ART)

COLOR DISPLAY SYSTEM UTILIZING OPTICAL VALVES

BACKGROUND OF THE INVENTION

1. Field of the Invention

The present invention relates to a colour display device using optical valves to produce an image by the projection, on a display means, of modulated and recombined beams of coloured light.

2. Description of the Prior Art

Present-day systems of this type generally have a source of white light, the light flux of which is separated into three beams of coloured light (for example, red, green and blue). The light from the three beams is then polarised, and then directed towards the three crystal matrices, each one of which modulates the beam that it receives as a function of control signals. The three images that are formed on the matrices are then enlarged and projected simultaneously by one or more lenses on the final display means of the image, namely for example on a screen, a wall etc.

One of the problems raised by presently used systems is their light efficiency: the maximum light flux emitted by the source has to be recovered so that the final image may be as luminous as possible and, at the same time, it must be seen to it that its homogeneity in colour and in luminance is not impaired. To this end, it is necessary for the illumination at any point of one of the matrices to be equal to that of the corresponding point on each of the other matrices, so as to avoid any colour variation in the final image. It is known that this condition may be achieved easily in provided that the distances between the source and the three matrices are made equal.

Another problem is that of achieving the maximum reduction in the space occupied by the systems for the recombination and projection of the three coloured images when a single objective is used to project them and to enlarge them. Indeed, in this case, after the three beams have each crossed a matrix, they should be recombined to form a colour image. Minimizing the space occupied by the recombination and projection systems amounts to reducing the distances, which besides are equal, from each of the matrices to the projection lens. The recombination means that enable this consist of two plane surfaces processed so as to intersect at their middle at right angles, in forming a substantially cube-shaped geometrical FIGURE, whence the name "recombiner cube" which shall be applied hereinafter to these means. The three matrices are then positioned so as to be before three faces of the cube parallel to the intersection of the processed surfaces, so that the recombined light goes through the fourth of these faces before which the projection lens is placed.

This kind of an arrangement of recombination and projection systems is found in a projection device disclosed by the Japanese patents Nos. 62-254589 and 62-22219, filed on behalf of SEIKO and shown in FIG. 1 of the appended drawings. In this projection device, the white light coming from the source S is divided, by means of two dichroic mirrors D1, D2 placed in parallel, into three beams, coloured red, green and blue, which are respectively directed towards the optical valves V1, V2 and V3, which are positioned in the above-described manner with respect to a recombiner cube C and an optical projection device 0. The drawing clearly shows that the distances from the source S to the valves V1, V2 and V3 are not equal, the distance up to the valve V1 being substantially longer.

The same remark is applicable to the projection system described in the published patent application No. EP-A-0 331 326, filed on behalf of MATSUSHITA. This projection system has a device for the separation of the beams formed by the two dichroic mirrors D'1, D'2 that intersect each other perpendicularly at their middle as illustrated in FIG. 2 (this device shall hereinafter be called a "divider cube" by analogy with the above-mentioned "recombiner cube"). Here, the equal paths of the light between the source S and the valves V1 and V2 are very substantially longer than the path up to the valve V2.

By contrast, in another projection system known from the patent application No. EP-A-87201558.1 now EP-A-028927, filed on behalf of PHILIPS and shown in FIG. 3, where the divider device includes two parallel dichroic mirrors D1, D2, the distances between the source S and the three valves V1, V2 and V3 are quite identical. But then, this condition dictates a position of the valves that does not enable the minimizing of the distance from the three valves to the projection lens 0 by using a recombiner cube.

SUMMARY OF THE INVENTION

The invention is aimed at the providing, in a colour display device implementing means to separate a white light beam into three beams of coloured light, of three optical valves, means to recombine the coloured beams and a projection optical device, arrangements such that it is possible to use a recombiner cube to minimize the distance from the valves to the optical projection device, to minimize the space occupied while at the same time having identical distances between the light source and the three valves.

To this effect, the invention proposes a device comprising a recombiner tube, three optical valves before three faces of said cube, parallel to the intersection of its treated surfaces, and an optical projection device beyond the fourth of these faces, wherein said separating means are a divider cube, the intersection of the surfaces of which is on the same line as said intersection of the recombiner cube, wherein the treated surfaces of the divider cube and the recombiner cube are in one and the same plane in sets of two, and wherein the paths of the beams of coloured light outside said divider and recombiner cubes up to their respective valves are identical.

BRIEF DESCRIPTION OF THE DRAWINGS

The invention will be understood more clearly from the following explanations and from the appended drawings, of which.

MORE DETAILED DESCRIPTION

Figure 1:
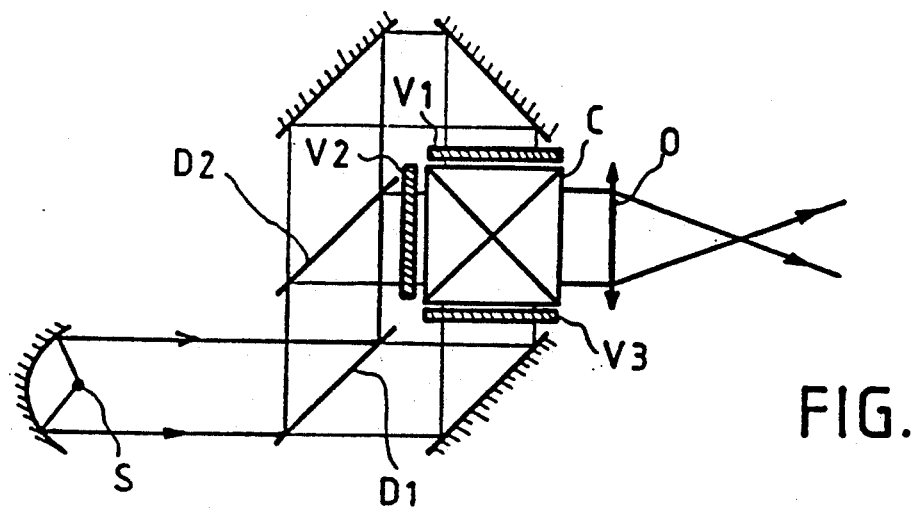
FIGS. 1 to 3 give a schematic view of three known devices.
Figure 2:
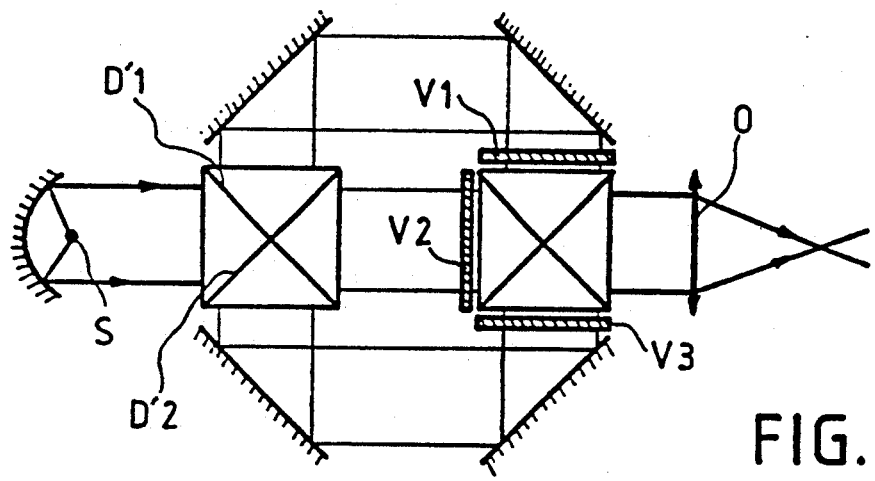
Figure 3:
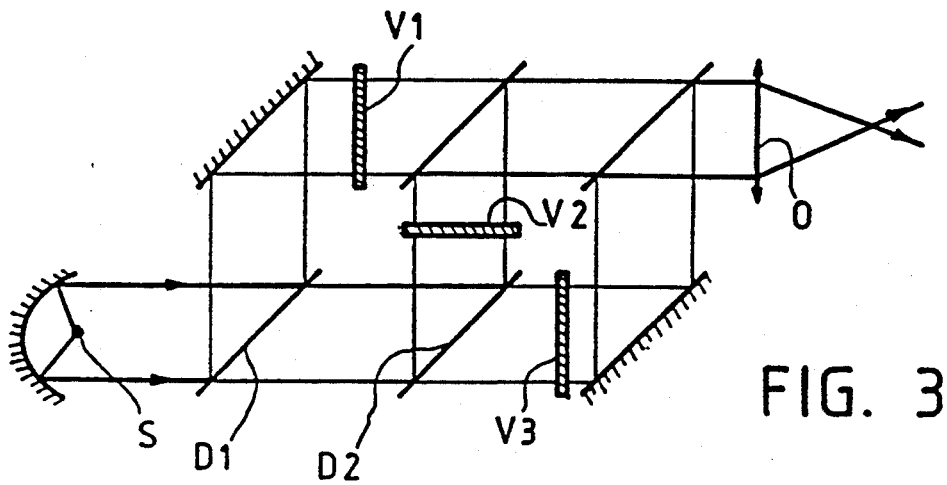
Figure 4:
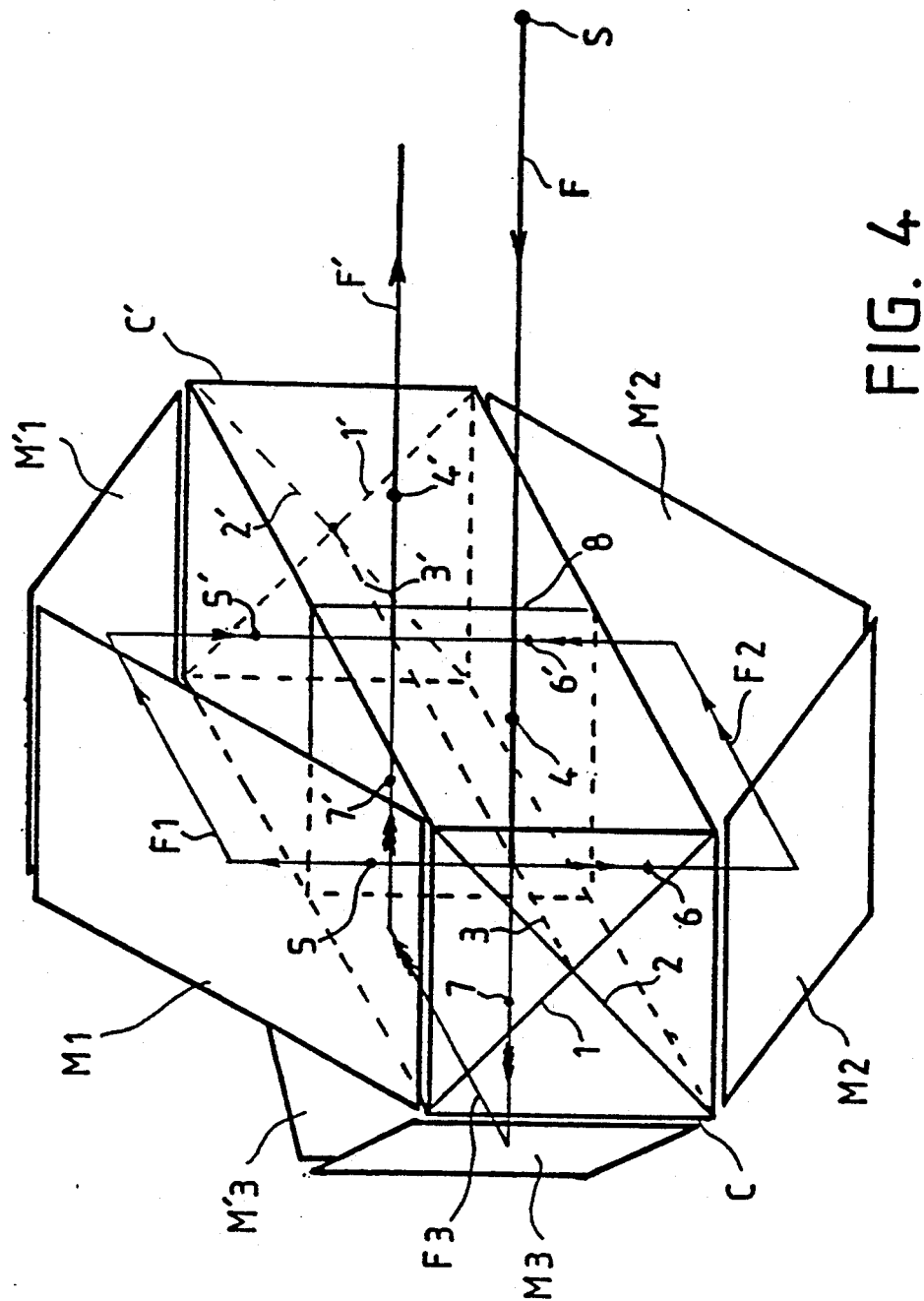
FIG. 4 shows a schematic view, in perspective, of a device according to the invention in a first embodiment.
Figure 5:
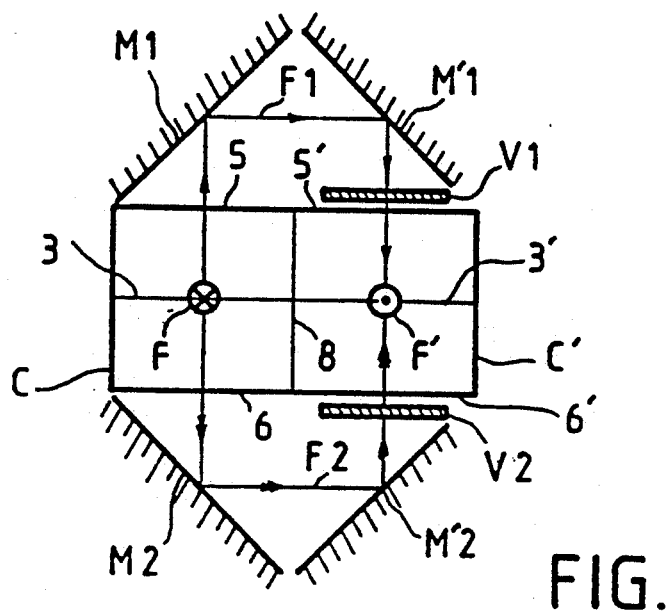
FIGS. 5 and 6 show respectively front and top views of the device of FIG. 4.
Figure 6:
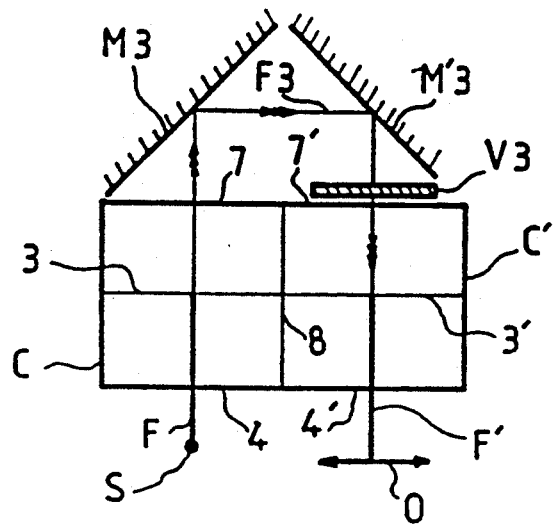

In the device shown in FIGS. 4 to 6, a source S emits a beam of white light, symbolised by the ray F, towards the divider cube C, comprising two plane treated surfaces 1 and 2 which intersect at right angles in their middle, their intersection carrying the reference 3. In practice, the cube C may be formed by the X-shaped junction of two dichroic mirrors or, more commonly, by the joining of four identical prisms with isosceles right triangle sections, at least one of the faces of which, designed to come within the cube, is treated.

In the cube C, the faces 1 and 2 respectively reflect, for example, the blue light and the red light of the beam of white light F arriving perpendicularly on the face 4, in letting through the green light. From the faces 5, 6 and 7 of the cube C, therefore, there emerge respectively a beam of blue light, a beam of red light and a beam of green light, symbolised by the rays F1, F2 and F3 which, with F, are in a same plane perpendicular to the intersection line 3.

The recombination means of the device consist of a recombiner cube C', the treated surfaces 1' and 2' of which intersect at 3' and respectively have the same properties as the treated surfaces 1 and 2 of the cube C, i.e. the surface 1' reflects the blue light and the surface 2' reflects the red light. Before the faces 5', 6', 7', there are placed optical valves V1, V2, V3 which are not shown in FIG. 4 for reasons of clarity. These are, for example, nematic helix liquid crystal optical valves or smectic, ferroelectric or other liquid crystal valves.

According to a major feature of the invention, the cubes C and C' are positioned with respect to each other in such a way that the intersections 3 and 3' are aligned and the surfaces 1 and 1' on the one hand and the surfaces 2, 2' on the other hand are in one and the same plane. In the exemplary embodiment shown, the two cubes C and C' are attached at 8 and, in practice, they are formed without any interruption of continuity in a single block in a square-sectioned parallelepiped shape.

The beam F1, beyond the face 5 of the divider cube C, undergoes a double reflection, so that it falls on the face 5' of the recombiner cube C' located in the extension of the face 5, after modulation in the valve V1. The same is true of the beams F2 and F3 and, according to the invention, the pairs of mirrors M1 and M'1, M2 and M'2, M3 and M'3 assigned to this dual reflection are positioned identically with respect to the two cubes C and C'. In the embodiment shown, the mirrors of each pair are inclined at 45°, symmetrically, before two faces extending the cubes, namely the faces 5, 5' or 6, 6' or 7, 7'.

The beams F1, F2 and F3 are then recombined in the cube C' so as to emerge by the face 4' in the form of a single beam symbolised by the ray F'.

Among the optical valves that are used in the systems of display by projection, there are certain valves that require an illumination in polarised light. Since the white light emitted by the sources is generally not polarised, it is therefore necessary to polarise it before making it reach the valves.

There are means capable of polarising light beams with output values of over 80%, and of simultaneously converting square-sectioned or circular-sectioned beams into beams with a roughly rectangular section.

Figure 7:
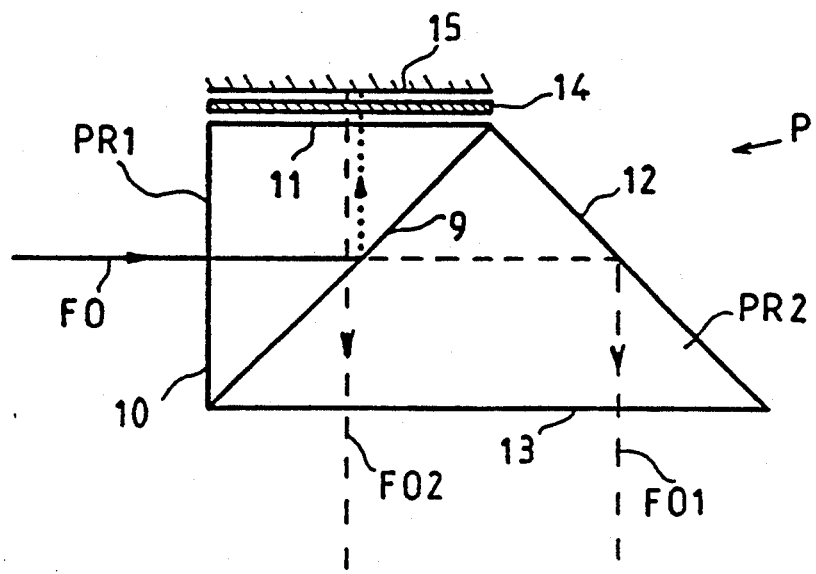
FIG. 7 shows a schematic view of a polarisation device that can be used in an apparatus similar to that of FIGS. 4 and 6.

FIG. 7 illustrates a polarisation device P that has these features but, in addition to the gain in light output resulting from its use, lends itself particularly well to integration in a projection apparatus according to the invention, owing to the fact that it practically does not increase the space factor and that it brings into question neither the equality of the optical distances between the source and the valves nor the minimizing of the distances between the valves of the optical projection device.

The polarisation device P includes two prisms PR1 and PR2, the cross-sections of which are isosceles right triangles. They are attached by contact between the large lateral face of the prism PR1 and one of the small lateral faces of the prism PR2. The common surface 9 has a treatment, for example of a multiple-layer type, and constitutes the separation surface of the device. Furthermore, a quarter-wave type delaying plate 14 and a mirror 15 are positioned in parallel before the face of the prism PR1. The inlet surface of the light beam to be polarised, symbolised by the ray FO, is the face 10 of the prism PR1. This surface preferably has a roughly square shape. The beam FO of non-polarised light is separated into two beams FO1 and FO2 at the separation surface 9. The light of the transmitted beam FO1 is rectilinearly polarised, in parallel to the plane of the drawing (shown in dashes). It continues its path in the prism PR2, gets reflected on its face 12 and emerges by its face 13.

The beam FO2, reflected by the surface 9, conveys rectilinearly polarised light perpendicularly to the plane of the drawing (shown in dots). It emerges from the prism PR1 by its face 11, crosses the quarter-wave type delaying plate 14, gets reflected on t he mirror 15, again crosses the plane 14 and again penetrates the prism PR1. The light of the beam FO2 is then rectilinearly polarised, in parallel to the plane of the drawing, like the beam FO1. It therefore crosses the surface 9 and emerges from the device by the face 13 of the prism PR2. At output, the beams FO1 and FO2 are juxtaposed. The set P consequently gives a single beam of light with a roughly rectangular section. It is further noted that the paths travelled by the two beams FO1 and FO2 up to the output of the prism PR2 have the same lengths.

Figure 8:
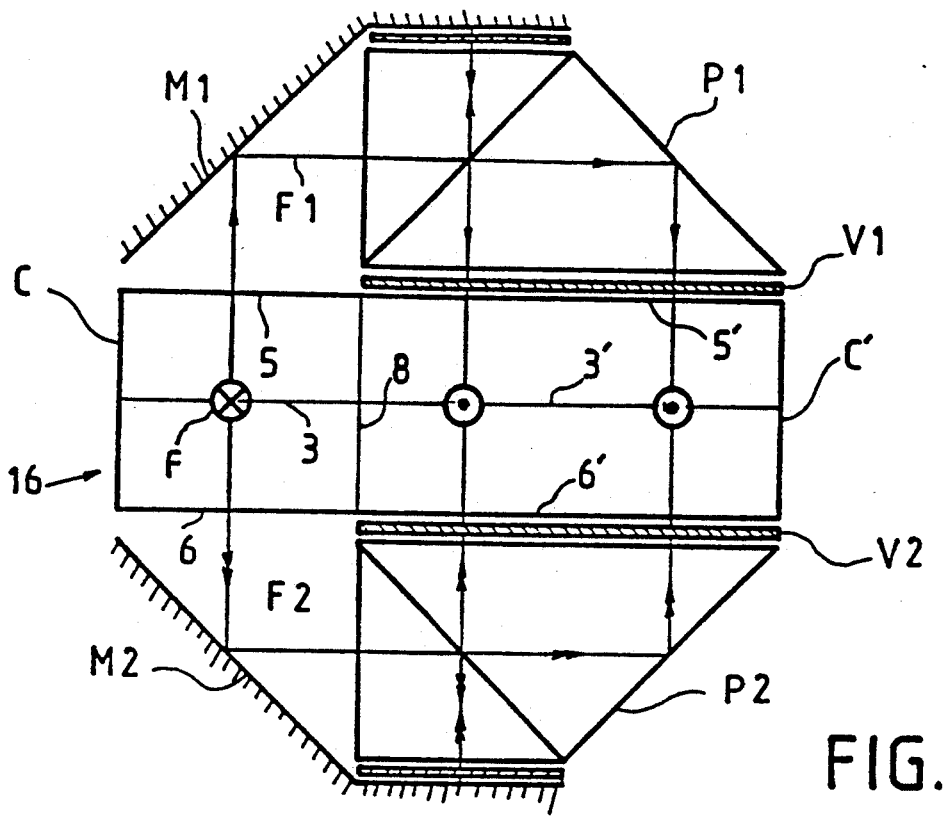
FIGS. 8 and 9 are respectively front and top views of an apparatus using the schematic view of FIG. 7; and, FIG. 10 shows a schematic side view of a device according to the invention, in another exemplary embodiment.
Figure 9:
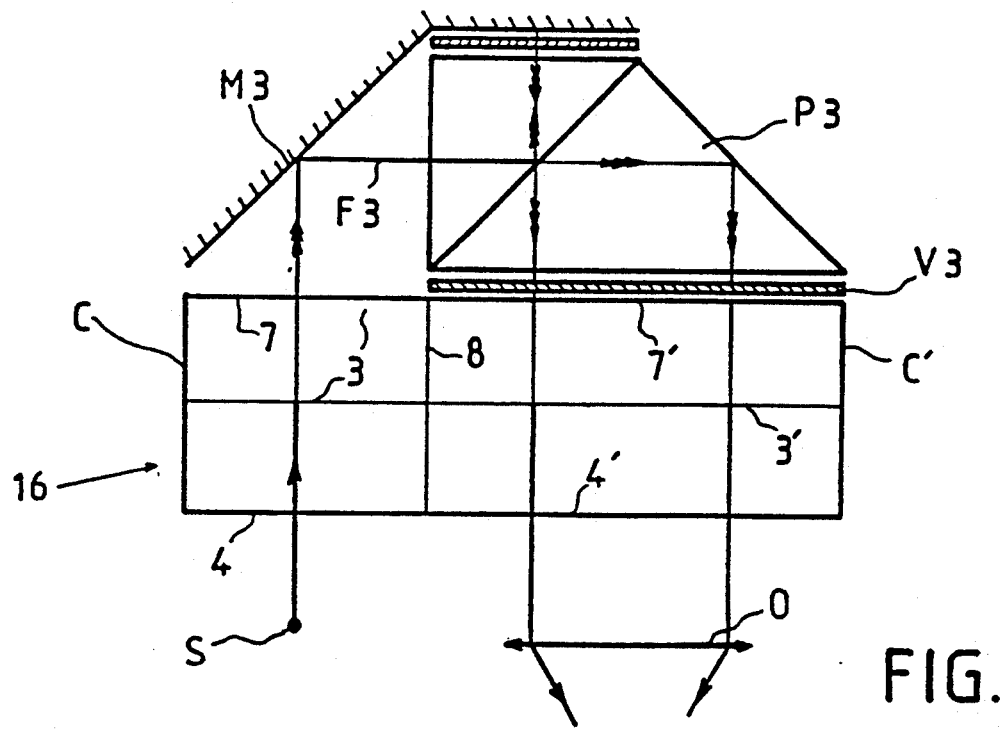

FIGS. 8 and 9 show a display device of the type shown in FIGS. 4 to 6, in which there are incorporated polarisation means in the form of the set P.

In the block 16 grouping together the divider cube C and the recombiner cube C', the latter (although it is still called a cube) now has the shape of a square-sectioned parallelepiped demarcated by the fictitious line 8, the rectangular lateral faces 4' to 7' of which correspond dimensionally to the lateral valves V1, V2 and V3.

Furthermore, before the outlet faces 5, 6, 7 of the divider cube C, there is still provision for the reflection mirrors M1 to M3 inclined by 45° while, before the valves V1, V2, V3 and the corresponding faces 5', 6', 7' of the recombiner cube C', polarisation sets P1, P2, P3 replace the mirrors M'1, M'2, M'3 of the device of FIGS. 4 to 6.

The three sets P1, P2, P3 respectively polarise the three beams F1, F2, F3 separated by the divider cube C, after they have been reflected by the mirrors M1, M2, M3, and convert each of them into two juxtaposed beams at the level of the valves V1 to V3. As noted previously, the optical paths of the two beams juxtaposed in the sets P1 to P3 have the same length, so that the same is the case for the six different paths of the light between the source S and the valves V1, V2, V3, the optical distance of these valves from the optical projection device 0 remaining furthermore minimal. In practice, the sets P1 to P3 enable an improvement in the light output by a factor of about 2, and the reduction of the space occupied by the display device by about 30%.

Figure 10:
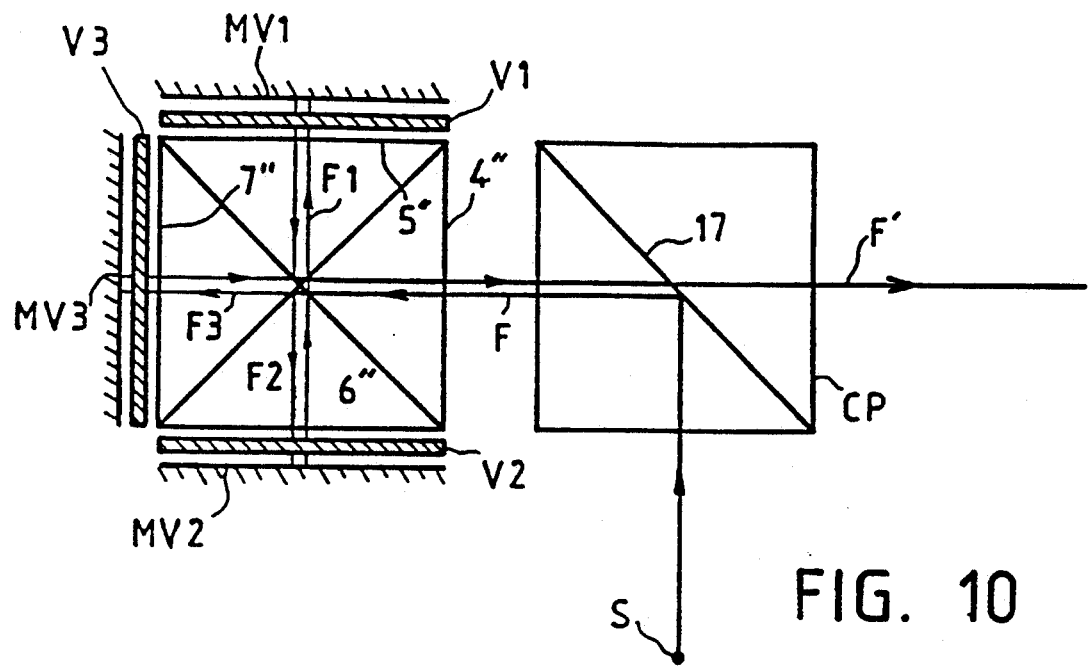

In the display device of FIG. 10, the valves V1, V2, V3 work in reflection. The means for the separation and recombination of light are constituted by one and the same element, namely a cube C" of the type described here above. The valves V1, V2, V3, with which mirrors MV1, MV2 and MV3 are associated in parallel are positioned so as to be before the faces 5", 6" and 7" of the cube C".

Before the inlet race 4", there is placed a polarising cube CP with a separating surface 17. The beam F of white light emitted by the source S gets reflected on the separating surface 17 and is then directed towards the inlet surface 4" of the cube C". The result thereof is three beams F1, F2, F3 emerging from the cube C" respectively by the faces 5", 6", 7", and corresponding to the colours red, green and blue. Each of the beams then crosses one of the valves V1, V2, V3, gets reflected on the associated mirror MV1, MV2, MV3 and returns to itself. The single beam F1' resulting from the recombination goes back through the face 4" and crosses the polarising cube CP to reach the optical projection system (not shown).

This architecture including light valves in reflection enables the optimising of the light output of the lighting system and the homogeneity of the image, the optical distances from the source S to the three valves being identical. The separation and recombination means are furthermore simplified, the same element C" having both functions. Naturally, in one variant, the polarising cube CP can be used as a transmitter of the light coming from the source S, the light from the beam F' being then reflected by the separating surface F' before reaching the optical projection device.

What is claimed is:

1. A color display system comprising:
   a source of a beam of white light;
   means for separating said beam of white light into three beams of colored light;
   three optical valves for modulating the respective beams of colored light;
   means for recombining the modulated three beams of colored light to form a recombined beam;
   means for reflecting said three beams of colored light to make equal the optical distances between said source of white light and said optical valves;
   polarizing means for dividing each of said three beams of colored light into two juxtaposed beams forming a single beam of uniformly polarized light for the corresponding optical valve
   said polarizing means comprising for each of said three beams of colored light first and second isosceles right triangle section prisms;
   each isosceles right triangle section prism having first and second small lateral faces and a large lateral face, the large lateral face of said first prism forming with the first small lateral face of said second prism a common light separation surface and the large lateral face of said second prism facing one of said optical valves and being parallel to the first small lateral face of said first prism of which the second small lateral face receives one of said three beams of colored light; and
   a mirror facing through a quarter-wave type delaying plate the first small lateral face of said first prism.

2. The system of claim 1, wherein said optical valves are one of nematic helix, smectic and ferroelectric liquid crystal valves.

3. The system of claim 1, wherein said separating means comprises a divider cube; and
   said recombining means comprises a recombiner cube;
   each of said cubes comprising two intersecting dichroic surfaces joining parallel and opposite sides of the cube, the two intersecting dichroic surfaces of said divider cube being respectively co-planar with the two intersecting dichroic surfaces of said recombiner cube.

4. The system of claim 3, wherein the divider cube and/or the recombiner cube comprises two plane dichroic mirrors which intersect at right angles in the middle.

5. The system of claim 3, wherein the divider cube and/or the recombiner cube comprise four identical right-angled prisms each having two small lateral faces of which at least one is dichroic.

6. The system of claim 3 wherein the divider and recombiner cubes are attached to each other.

7. The system of claim 6, wherein the divider and recombiner cubes are in a single block.

8. The system of claim 3, wherein said reflecting means comprises two mirrors for successively reflecting each of said three beams of color light between the divider and recombiner cubes.

9. The system of claim 3,
   wherein the divider and recombiner cubes are formed by one and the same element; and
   the system further comprises a polarizing cube for reflecting said beam of white light and transmitting said recombined beam towards the optical projection means, or, conversely, for transmitting said beam of white light and reflecting the recombined beam.

10. The system of claim 3, wherein said recombiner cube has the shape of a square-sectioned parallelepiped having rectangular lateral faces corresponding dimensionally to said lateral valves.

* * * * *